(12) United States Patent
Caron et al.

(10) Patent No.: US 11,842,654 B2
(45) Date of Patent: Dec. 12, 2023

(54) AIRWAY RESISTANCE DEVICE

(71) Applicant: CAE HEALTHCARE CANADA INC., St-Laurent (CA)

(72) Inventors: François Caron, Laval (CA); Myriam Bonneville, Montréal (CA); Jean-Sebastien Flamand, Montréal (CA); Yanick Fradette, St-Constant (CA)

( * ) Notice: Subject to any disclaimer, the term of this patent is extended or adjusted under 35 U.S.C. 154(b) by 0 days.

(21) Appl. No.: 18/319,744

(22) Filed: May 18, 2023

(65) Prior Publication Data

US 2023/0290277 A1 Sep. 14, 2023

Related U.S. Application Data

(63) Continuation of application No. PCT/CA2022/050464, filed on Mar. 29, 2022.

(60) Provisional application No. 63/167,604, filed on Mar. 29, 2021.

(51) Int. Cl.
*G09B 23/28* (2006.01)

(52) U.S. Cl.
CPC .................. *G09B 23/288* (2013.01)

(58) Field of Classification Search
None
See application file for complete search history.

(56) References Cited

U.S. PATENT DOCUMENTS

| | | |
|---|---|---|
| 4,546,796 A | 10/1985 | Bourquin |
| 5,575,453 A | 11/1996 | Dion |
| 5,772,442 A | 6/1998 | Lampotang et al. |
| 5,975,748 A | 11/1999 | East, IV et al. |
| 7,703,477 B2 | 4/2010 | Cook et al. |
| 7,857,625 B2 | 12/2010 | Gomo |
| 8,764,451 B2 | 7/2014 | Mestad et al. |
| 9,277,890 B2 | 3/2016 | Syroid et al. |
| 9,316,323 B2 | 4/2016 | Muci et al. |
| 9,328,829 B2 | 5/2016 | Fukano et al. |
| 9,475,686 B2 | 10/2016 | Tuohey et al. |
| 9,494,253 B2 | 11/2016 | Dam et al. |

FOREIGN PATENT DOCUMENTS

| | | |
|---|---|---|
| CN | 102580212 B | 9/2014 |
| CN | 109058520 A | 12/2018 |
| JP | H10252903 A | 9/1998 |

OTHER PUBLICATIONS

International application No. PCT/CA2022/050464 International Search Report dated Jul. 25, 2022.
International application No. PCT/CA2022/050464 Search Strategy dated Jul. 25, 2022.
International application No. PCT/CA2022/050464 Written Opinion of the International Searching Authority dated Jul. 25, 2022.
(Continued)

*Primary Examiner* — James B Hull

(57) ABSTRACT

An airway resistance device providing reliable and constant airway resistance for a given position of an occlusion mechanism that may be used in a lung simulator device in order to allow the simulation of a number of medical conditions which impacts the airflow in the airways. The airway resistance device includes one or more laminar flow channels and a variable occlusion mechanism that retains the laminar flow characteristics, such that resistance is constant for a given occlusion configuration.

18 Claims, 11 Drawing Sheets

(56) References Cited

OTHER PUBLICATIONS

Mesic, S, et al., "Computer-controlled mechanical simulation of the artificially ventilated human respiratory system". IEEE transactions on Biomedical Engineering, Jun. 11, 2003, vol. 50 (6), pp. 731-743.
Verbraak, A. F. M., et al., "Computer-controlled flow resistance". Medical & Biological Engineering & Computing, Nov. 1999, vol. 37 (6), pp. 770-775.
Verbraak, A. F. M., et al., "A new approach to mechanical simulation of lung behaviour: pressure-controlled and time-related piston movement". Medical & Biological Engineering & Computing, Jan. 2001, vol. 39(1), pp. 82-89.
Pasteka, R. et al., "Electro-mechanical Lung Simulator Using Polymer and Organic Human Lung Equivalents for Realistic Breathing Simulation". Scientific Reports, Dec. 24, 2019. vol. 9, pp. 12 pgs, intotal. Https://www.nature.com/articles/s41598-019-56176-6.pdf.
Chase, J.G. et al., "A novel mechanical lung model of pulmonary diseases to assist with teaching and training". BMC Pulmonary Medicine, Dec. 2006. vol. 6 (21), pp. 11 pgs, total. Https://bmcpulmmed.biomedcentral.com/track/pdf/10.1186/1471-2466-6-21.pdf.
Shi, Y. et al., "Pressure Dynamic Characteristics of Pressure Controlled Ventilation System of a Lung Simulator". Computational and Mathematical Methods in Medicine, Aug. 13, 2014, pp. 10 pgs, in total. Http://downloads.hindawi.com/jurnals/cmmm/2014/761712.pdf.
Corresponding Canadian patent application No. 3178336 Notice of allowance dated Mar. 2, 2023.

AIRWAY RESISTANCE DEVICE

CROSS-REFERENCE TO RELATED APPLICATIONS

This patent application is a continuation of international PCT patent application No. PCT/CA2022/050464 filed Mar. 29, 2022 designating the United States, that claims priority to U.S. provisional patent application 63/167,604 filed Mar. 29, 2021, the contents of which are hereby incorporated by reference.

TECHNICAL FIELD

The present disclosure relates to the field of medical simulators for use in training medical professionals, and in particular to a component simulating bronchial or airway resistance and occlusion for lung simulators.

BACKGROUND

Manikins simulating a variety of human organs and functions are used to train medical professionals in patient care, treatments and use of medical equipment. In order to learn and practice the use treatments and medical equipment related to the respiratory system, components simulating bronchial resistance are highly desirable to provide lung simulators with realistic responses to ventilation.

In order to simulate different medical scenarios, such as anaphylactic shocks, it is required to vary the bronchial resistance and to ultimately be able to fully occlude the airways. It is known in the art that a valve, such as a butterfly valve, may be used as an occlusion mechanism for varying the airflow from a mechanical ventilator to a lung simulator in order to simulate some degree of bronchial resistance.

However, in order to adequately represent airway resistance, valves used for bronchial resistance need to be dynamically controlled so as to compensate for the turbulent flow created in vicinity of the valves used. Without dynamically controlling the opening of the valve, the airway resistance may not remain constant as the flowrate changes. Therefore, prior art solutions do not allow adequate control of airway resistance for static systems (e.g., changing a valve opening to a predefined occlusion before the start of a simulation).

SUMMARY

The inventors have discovered that using an occlusion system consisting of one or more laminar flow channels, such that the airflow in the vicinity of the occlusion mechanism remains laminar, provides for adequate static control of airway resistance. In other words, for a predefined occlusion of the airway, the bronchial resistance will remain constant.

A first broad aspect is a lung simulation system including: a lung simulator; and an airway resistance device comprising a body defining an airtight internal chamber having an inlet and an outlet, the airtight internal chamber allowing a fluid to flow from the inlet to the outlet; and a variable occlusion mechanism defining one or more laminar flow channels and comprising a control mechanism to selectively vary at least one of a width, a length and a number of the one or more laminar flow channels to vary a simulated airway resistance between the inlet and the outlet.

A second broad aspect is a method of simulating lungs including connecting an airway resistance device to a lung simulator, the airway resistance device being configured to restrict an airflow being provided to the lung simulator. As with the first broad aspect, the airway resistance device can comprise:
a body defining an airtight internal chamber having an inlet and an outlet, the airtight internal chamber allowing a fluid to flow from the inlet to the outlet; and
a variable occlusion mechanism defining one or more laminar flow channels and comprising a control mechanism to selectively vary at least one of a width, a length and a number of the one or more laminar flow channels to vary a simulated airway resistance between the inlet and the outlet.

The method includes adjusting the control mechanism in accordance with a desired airway resistance for a simulation and applying a source of respiration airflow to the lung simulator through the airway resistance device.

In some embodiments, the variable occlusion mechanism includes a movable member, and the control mechanism includes a linear actuator connected to the movable member.

In some embodiments, the linear actuator comprises a bladder connectable to a fluid source and an inflation or deflation of the bladder results in the movable member moving to a position inside a conduit between the inlet and the airtight internal chamber.

In some embodiments, the variable occlusion mechanism includes a plug mounted in the airtight internal chamber.

In some embodiments, the one or more laminar flow channels are defined on an outer surface of the plug.

In some embodiments, the one or more laminar flow channels are located on an inner surface of at least one of the inlet and the outlet.

In some embodiments, the one or more laminar flow channels includes at least two laminar flow channels of different lengths so that displacement of the plug varies the number of opened one of the channels.

In some embodiments, the one or more laminar flow channels includes at least four laminar flow channels of different lengths so that displacement of the plug varies the number of opened one of the channels.

In some embodiments, the plug is a bullet-shaped plug.

In some embodiments, the bullet-shaped plug is inflatable and connectable to a fluid source, the bullet-shaped plug being configured to expand and contract with fluid pressure to vary a width of the laminar flow channel.

In some embodiments, the variable occlusion mechanism includes a displaceable sidewall and the control mechanism comprises at least one bladder connectable to a fluid source and an inflation or deflation of the at least one bladder displaces the displaceable sidewall to increase or decrease the width of the one or more laminar flow channels.

In some embodiments, the airtight internal chamber includes one or more outlet configured to be the one or more laminar flow channels and the variable occlusion mechanism is operable to gradually obstruct the one or more laminar flow channels.

In some embodiments, the variable occlusion mechanism includes a piston.

In some embodiments, the lung simulation system further includes a sensor system measuring a state of lung inflation and deflation of the lung simulator operably connected to the control mechanism of the airway resistance device and providing dynamic control to the airway resistance device to simulate a variation in airway resistance depending on the measured state.

In some embodiments, the lung simulation system further includes a controller operably connected to the sensor system and the airway resistance device, the controller providing the dynamic control to the airway resistance device.

In some embodiments, in a method of simulating lungs, the applying a source of respiration airflow to the lung simulator through the airway resistance device can cause a pressure drop across the airway resistance device that is proportional to the respiration airflow.

In some embodiments, in a method of simulating lungs, the adjusting the control mechanism in accordance with a desired airway resistance for a simulation can comprise keeping the control mechanism fixed with the desired airway resistance while the applying source of respiration airflow provides a number of respiratory cycles of respiration airflow.

In some embodiments, in a method of simulating lungs, the adjusting the control mechanism in accordance with a desired airway resistance for a simulation comprises increasing the desired airway resistance during the simulation to simulate an increase in airway resistance.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to an airway (in some cases, simply a bronchial) resistance device for use with a lung simulator and configured to simulate in a reliable manner the airway resistance experienced by a person having a healthy respiratory system or a system affected by one of several medical conditions given the person's gender and age. As such, the resistance device described herein may be coupled to a mechanical ventilator and a lung simulator of a manikin.

Simulating airway resistance with a valve that may be variably opened and closed is known in the art. However, due to fluid dynamics, the airflow disturbance in the vicinity of the valves used in the prior art may not consistently allow to obtain a desired resistance by statically positioning the valve to a given setting. Therefore, in order to obtain a desired airway resistance, the valve must be dynamically controlled, such that the degree of opening may be varied depending on the readings of sensors.

By using an occlusion mechanism in which the airflow is kept as much as possible in a laminar flow state, the resistance becomes a constant independent of flow rate and the relation between the position of the occlusion mechanism and the resistance can be easily calculated. For laminar flows, the resistance inside a circular pipe, that is significantly longer than it is wide, can be calculated using the Hagen-Poiseuille equation:

$$R = \frac{8\mu L}{\pi r^4}$$

in which µ is the dynamic viscosity, L is the length of the pipe and r is its radius. Thus, varying the length of the pipe and/or the radius of the pipe provides for two types of adjustment, one (the radius) being more granular than the other.

It will be appreciated that although the resistance device is described as being connectable to a ventilator via a tube to simulate ventilation, it can also be connected to any other source of ventilation used by medical practitioners (e.g., bag mask, human ventilation during mouth-to-mouth procedures, etc.) and have different adapters to accommodate the use of those different sources of ventilation without departing from the teachings of this disclosure. The resistance device can also be used anywhere between a source of ventilation and a lung simulator, such as outside or inside a manikin, in a simulated airway or in a tube leading to the simulated airway.

A person skilled in the art will further understand that although described as using bladders, other components that takes an air input and outputs a displacement may be used in place of the bladders. As such, air bags, bellows, syringes, pistons may be used in the device.

Figure 1A:
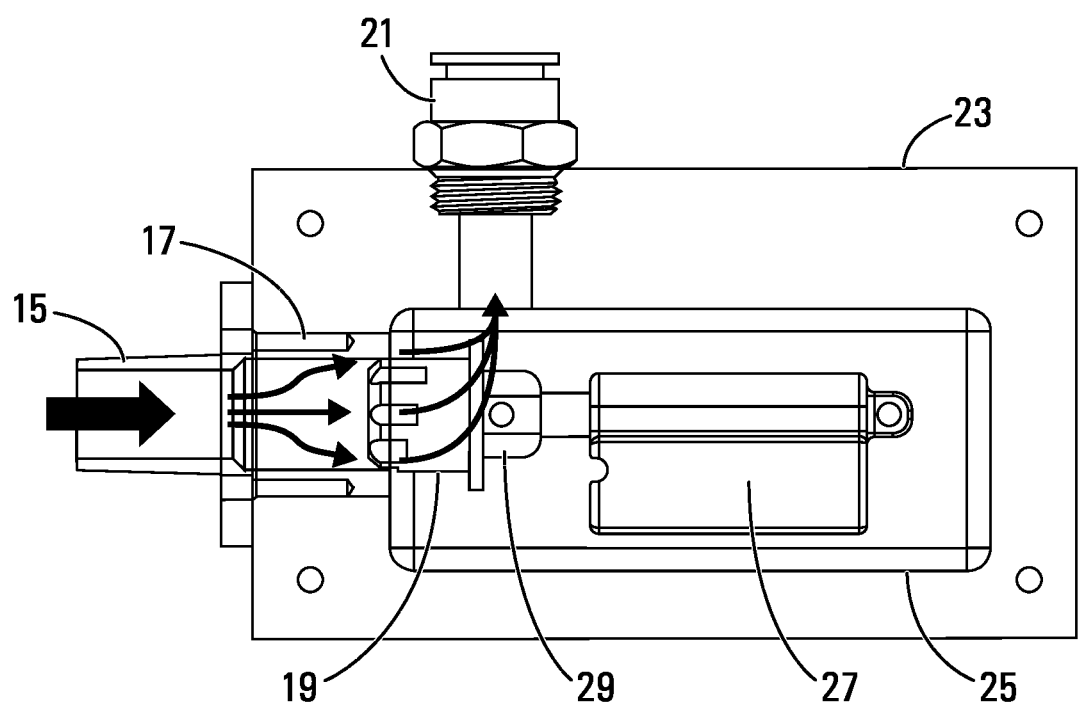
FIG. 1A is a cross sectional side view of an exemplary airway resistance device with a single outlet and a linear motor control mechanism of the occlusion mechanism.

FIG. 1A is a side view of an exemplary resistance device with a single outlet 21 and a control mechanism comprising an actuator 27. In this embodiment, the resistance device has all its components enclosed in a frame 23 which allows the device to be attached to a surface or other simulator modules (e.g., inside a manikin). In order to easily and securely connect the inlet 17 of the device to a tube, which is further be connected to a mechanical ventilator, the resistance device may have an adapter 15. The adapter 15 may be removable to allow the use of different adapters to accommodate different connections to the device.

In one embodiment, the inlet 17 of the bronchial resistance device is a cylindrical tube in which a cylindrical plug 19 may slide to variably occlude the airflow. The device may further comprise an airtight internal chamber 25 and at least one outlet 21. This airtight internal chamber 25 allows the use of multiple outlets 21 with a single inlet 17 and the airflow going through the occlusion mechanism. Using two outlets 21 connected through the same bronchial resistance device may thus better represent the human respiratory system. Reference herein to the human respiratory system is not intended to limit the application of the resistance device exclusively to human lung simulators. For instance, simulators of canine, equine and bovine lungs can also benefit from the invention.

In the embodiment of FIG. 1A, the occlusion mechanism is a cylindrical plug or slide 19 with a number of laminar flow channels on its outer surface. As will be further described hereinafter, the laminar flow channels can have different lengths, such that sliding the cylindrical plug 19 further inside the inlet 17 closes a selected number of channels. The displacement of the cylindrical plug 19 may be made through an actuator 27 by pushing a rod fixed to an attachment part 29 on the cylindrical plug 19. The actuator 27 may be controlled by various means, such as by manual inputs to a controller operably connected to the actuator 27 or by a software responsive to a state of a connected lung simulator.

Figure 1B:
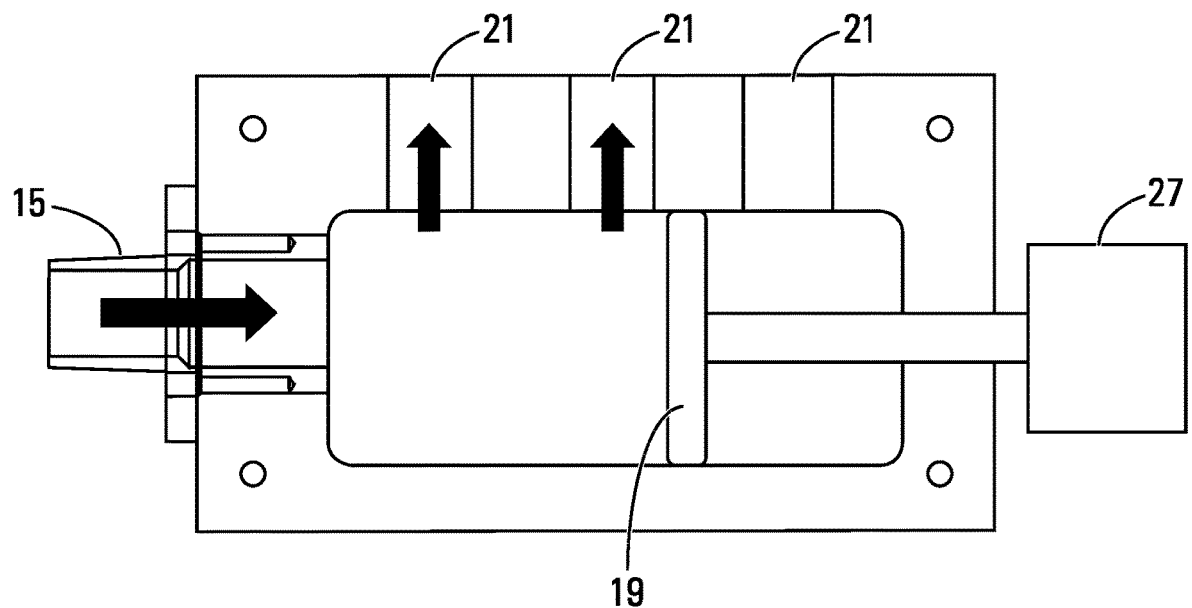
FIG. 1B is a cross sectional side view of an exemplary airway resistance device with multiple outlets and an outlet occlusion mechanism with a linear motor and piston as the control mechanism.

Now referring to FIG. 1B, which is a side view of an exemplary airway resistance device with multiple outlets 21 and an outlet occlusion mechanism with a linear actuator 27 and piston-like plug 19 as the control mechanism.

Where FIG. 1A presents an embodiment in which a number, a width or a length of laminar flow channels provide the airway resistance for the airflow at the inlet of the resistance device, the same may be done at the outlet of the resistance device. Although the same occlusion mechanism as the FIG. 1A embodiment may be used to variably occlude the outlet instead of the inlet, other configurations may provide similar variable occlusion controls, such as the one presented in the embodiments of FIGS. 1B and 1C.

The embodiment of FIG. 1B comprises an occlusion mechanism that is a piston 19 that is configured to move inside the internal chamber of the resistance device in order to open/close a desired number of outlets 21. The movement of the piston 19 may be controlled by an actuator 27, which may be a linear motor. The piston 19 may further be moved in a manner to partially occlude one of the outlets 21, such that a different airway resistance may be achieved. The outlets 21 have a constant circular cross-section and, as such, are laminar flow channels. Additionally, to reduce turbulence at the entry of these laminar flow channels, the piston 19 may have a smoothed notch easing the section change towards the outlet 21.

An airway resistance device such as shown in this embodiment may be desirable when paired in with a lung simulator system comprising a number of lung bladders or bellows (e.g., representing multiple lung sections, such as upper/lower and left/right) as it allows complete occlusion of one or more portions of the simulated lungs while maintaining reduced or no resistance for the remaining lung sections. As such, this may be used to simulate certain medical conditions (e.g., a patient that had undergone surgery for partial lung ablation) which may otherwise be harder to recreate or that may require physical changes to the lung simulator setup inside a manikin.

It will be understood that the piston 19 and actuator 27 may be replaced by any other means of changing and controlling the internal chamber's available volume, which may be done electronically, mechanically, etc.

Figure 1C:
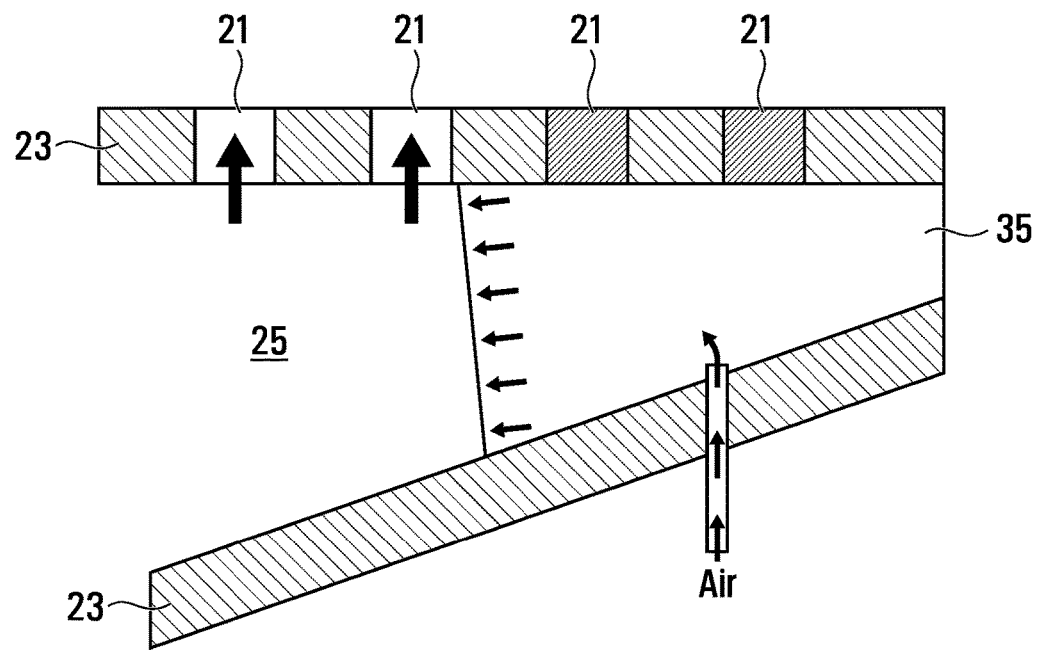
FIG. 1C is a schematic of an exemplary internal chamber of an airway resistance device comprising multiple outlets and an occlusion mechanism consisting of a bladder.

One of such other means of changing and controlling the internal chamber's available volume is illustrated in the embodiment of FIG. 1C, which is a schematic of an exemplary internal chamber 25 of an airway resistance device comprising multiple outlets 21 and an occlusion mechanism consisting of a bladder 35. In this embodiment, the piston/actuator of FIG. 1B is replaced by a bladder 35, the inflation and deflation of which occludes any number of outlets 21. The bladder 35 may be filled with air, or any other fluid, which may be readily available in a lung simulator setup in which the airway resistance device may be used.

Figure 2A:
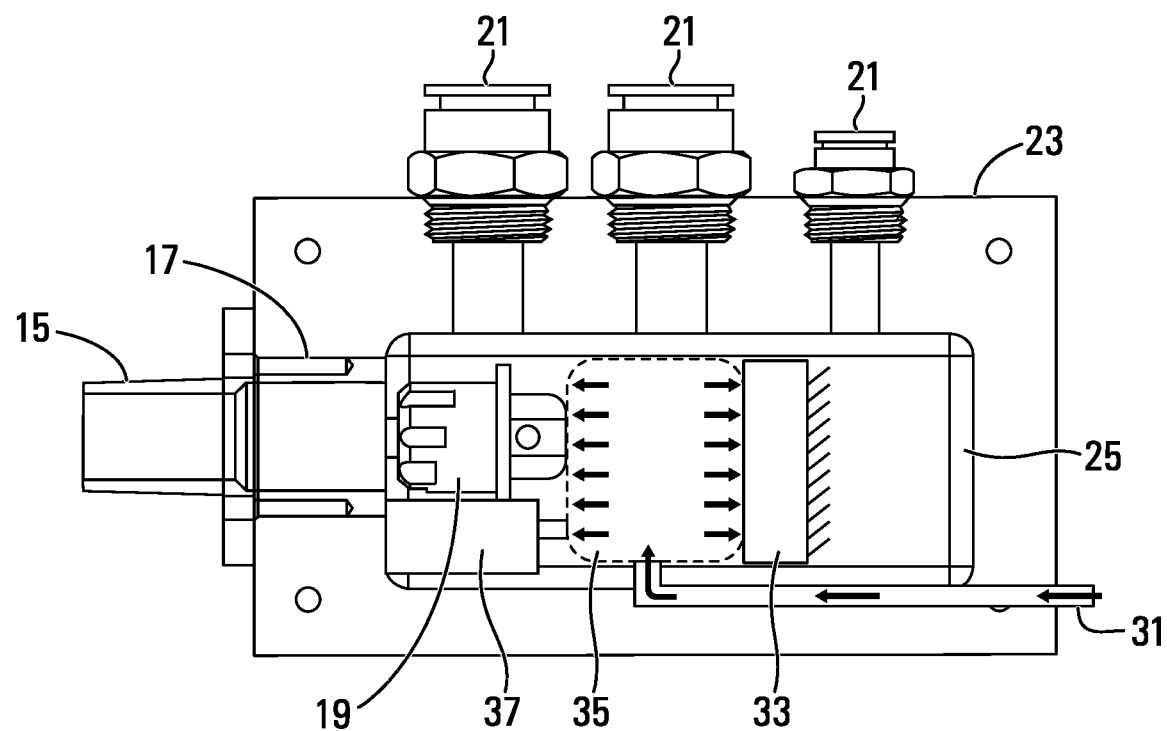
FIG. 2A is a cross sectional side view of an exemplary airway resistance device with multiple outlets and a control mechanism comprising an air bladder and a position sensor.

FIG. 2A is a side view of an exemplary resistance device comprising multiple outlet ports 21 and a control mechanism comprising an air bladder 35 and a position sensor 37. Similar to the embodiment of FIG. 1A, the frame 23 of the device can allow an adapter 15 to be fixed to the inlet part 17 and the air can flow from the inlet 17 to an airtight internal chamber 25 through an occlusion mechanism. In this embodiment, the occlusion mechanism is a cylindrical plug 19 with multiple laminar flow channels but its control mechanism may be an air bladder 35' instead of a linear motor 27.

The air bladder 35' may be connected to an air source 31 to allow the control of the inflation and deflation of the air bladder 35', directly through the air source or through a control valve on the tube connecting the air source 31 to the bladder 35'. It will be understood by a person skilled in the art that any type of fluid may be used to change the volume of the bladder without departing from the teachings of this disclosure.

It will be understood that the term air bladder 35' includes any reservoir that takes an air input to then output a displacement, such as bellows, bags, syringes, air pistons, etc.

A sensor 37 can be used to provide the position of the cylindrical plug 19 in the device's inlet 17. This may be done in a number of different ways, such as having a sensor 37 measuring the position of the plug 19, measuring the position of the bladder 35', measuring the volume and pressure of the bladder 35' or any other parameters allowing to derive the position of the plug 19.

As the cylindrical plug 19 can be fixed to one of the bladders' sides 35' and the other side of the bladder is against a wall 33, any change in the bladder's 35' volume results in the displacement of the plug 19 in the inlet 17.

It will be understood by a person skilled in the art that any other control mechanism may be used without departing from the teachings of this disclosure. As such, some embodiments may have a mechanical control mechanism that may allow manual manipulation of a lever or a wheel such that it may move the plug 19 inside the inlet 17. Additionally, some embodiments may include mechanical stops at different lever or wheel angles, representing a specific resistance produced by the bronchial resistance device. Therefore, the device may not require any form of electrical power or fluid supply in order to function and allow variable resistance levels.

Figure 2B:
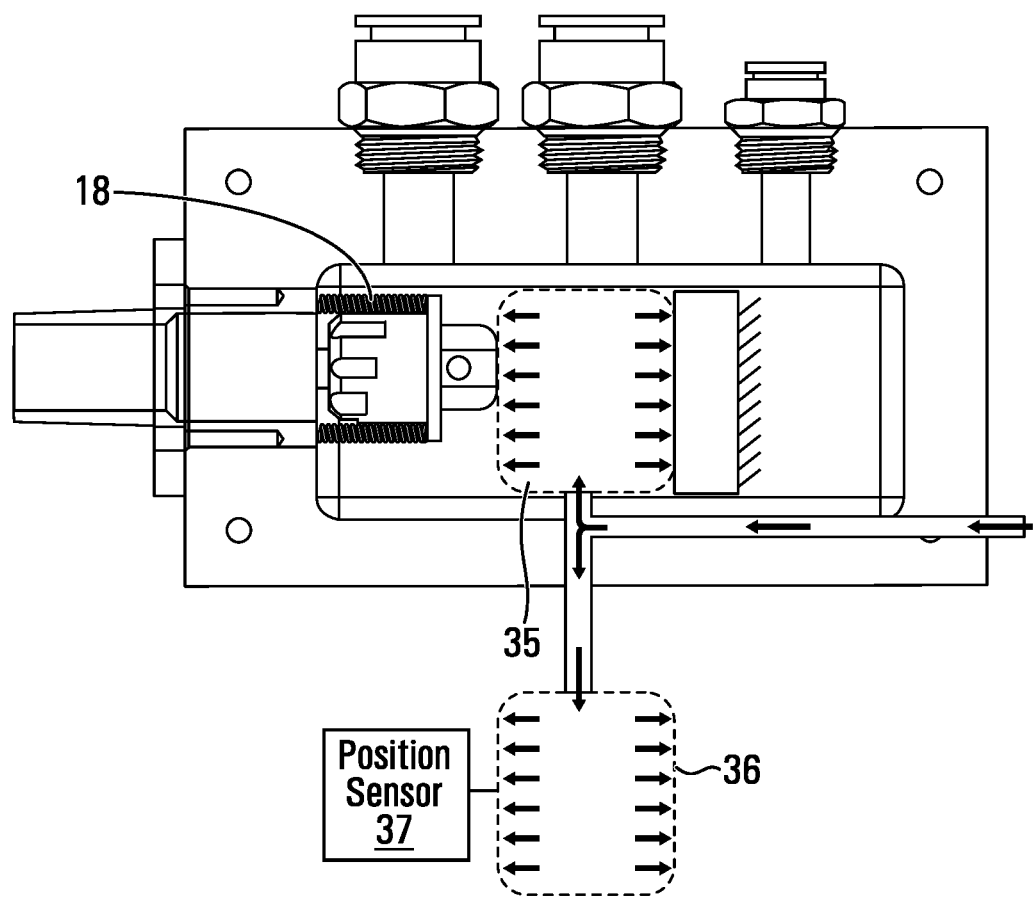
FIG. 2B is a cross sectional side view of an exemplary airway resistance device with multiple outlets and a control mechanism comprising an air bladder with a reciprocating bladder to which a position sensor is connected.

FIG. 2B is a side view of an exemplary airway resistance device with multiple outlets and a control mechanism comprising an air bladder 35' with a reciprocating bladder 36 to which a position sensor 37 is connected. This embodiment is similar to the one presented in FIG. 2A but allows to save internal space in the airway resistance device by moving the position sensor outside of the frame. This type of setup may be necessary for cramped space which would not allow the increase of size in the device to accommodate the sensor, but for which there would be available space outside the device that could be used to store the reciprocating bladder 36.

As such, the embodiment of FIG. 2B provides the same functionalities as described for FIG. 2A. Additionally, FIG. 2B illustrates the use of biasing elements 18, such as springs, fixed to the inlet and the plug, such that these elements help the plug back in the fully open position when the bladder is deflated. It will be understood by a person skilled in the art that other configurations, using tension springs instead of compression springs, may be used and that any other elements providing absorption and release of energy may be used in lieu of springs (e.g., bungee cords, elastics, etc.).

Figure 3A:
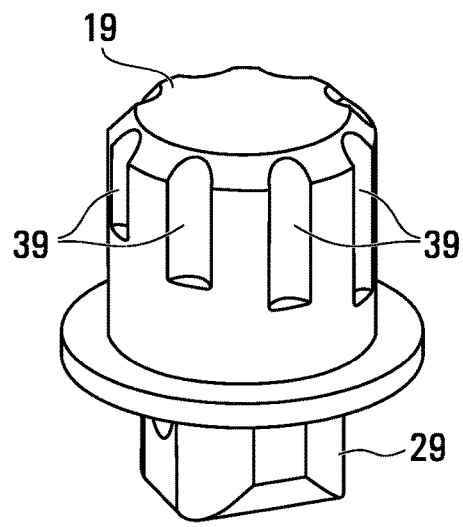
FIG. 3A is an isometric view of an exemplary cylindrical plug comprising a plurality of laminar flow channels on its outer surface.

Now referring to FIG. 3A which is an isometric view of an exemplary cylindrical plug 19 comprising a plurality of laminar flow channels 39 on its outer surface. In this embodiment, the laminar flow channels 39 may have different lengths, such that it is possible to control the number of laminar flow channels 39 in which air is flowing by moving the cylindrical plug 19 in the inlet 17. As the plug 19 is moved further inside the inlet 17, the laminar flow channels 39 are gradually closed as they stop connecting to the airtight internal chamber 25. The cylindrical plug 19 may also include an attachment part 29 to connect to a rod from a motor or actuator, the side of a bladder or to any other means of moving the plug 19 inside the inlet 17.

Laminar flow channels 39 act as pipes in which the air flows from the plug head to the airtight internal chamber 25 when they connect. As the laminar flow channels 39 all have a given length shorter than the total length of the plug 19 that may be inserted in the inlet 17, completely inserting the plug 19 results in total occlusion of the airflow, therefore simulating bronchial occlusion conditions. The laminar flow channels 39 may have mostly circular cross-sections in order to have laminar flow conditions inside the channel and may have smoothed head sections to limit turbulent entry conditions.

As will be further described herein, other embodiments may have different shapes of the plug 19 while still including a number of laminar flow channels 39. Furthermore, to better accommodate the laminar flow inside the inlet, the plug may have a conical head section that reduces vortices generation at the tip of the plug 19 when inserted in the airflow.

Figure 3B:
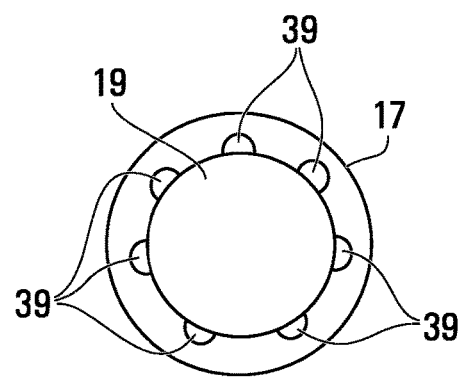
FIG. 3B is a front view of an exemplary cylindrical plug comprising a plurality of laminar flow channels on the inner surface of a cylindrical inlet tube.

FIG. 3B is a front view of an exemplary cylindrical plug 19 comprising a plurality of laminar flow channels on the inner surface of a cylindrical inlet tube 17. This embodiment uses the same working principle of the cylindrical plug 19 of FIG. 3A, however, instead of the laminar flow channels 39 being on the surface of the plug, they are on the inner surface of the inlet 17. Additionally, in this embodiment, the plug 19 is a simple cylinder.

Figure 3C:
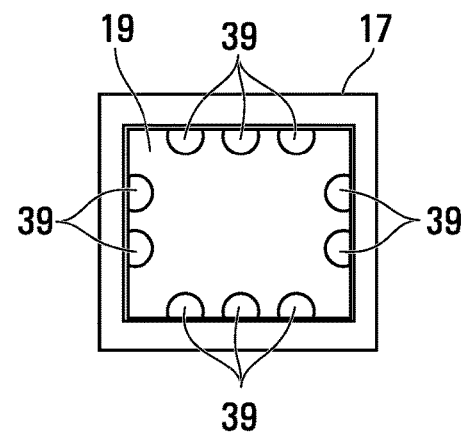
FIG. 3C is a front view of an exemplary rectangular plug comprising a plurality of laminar flow channels on the outer surface of the rectangular plug.

Similarly, FIG. 3C is a front view of an exemplary rectangular plug 19 comprising a plurality of laminar flow channels 39 on the outer surface of the rectangular plug 19. Although designing a rectangular pipe inlet 17 and a rectangular plug 19 may require additional considerations in order to keep the airflow mostly laminar in the pipe (e.g., length vs height ratio to obtain a flow similar to the one in a circular pipe), the overall design requirements of the bronchial resistance device may be limited, to fit inside a given space inside a manikin, and a rectangular shape may be required. Moreover, the laminar flow channels 39 retain their mostly circular cross-sections such that the airflow inside the channels may be laminar.

Figure 3D:
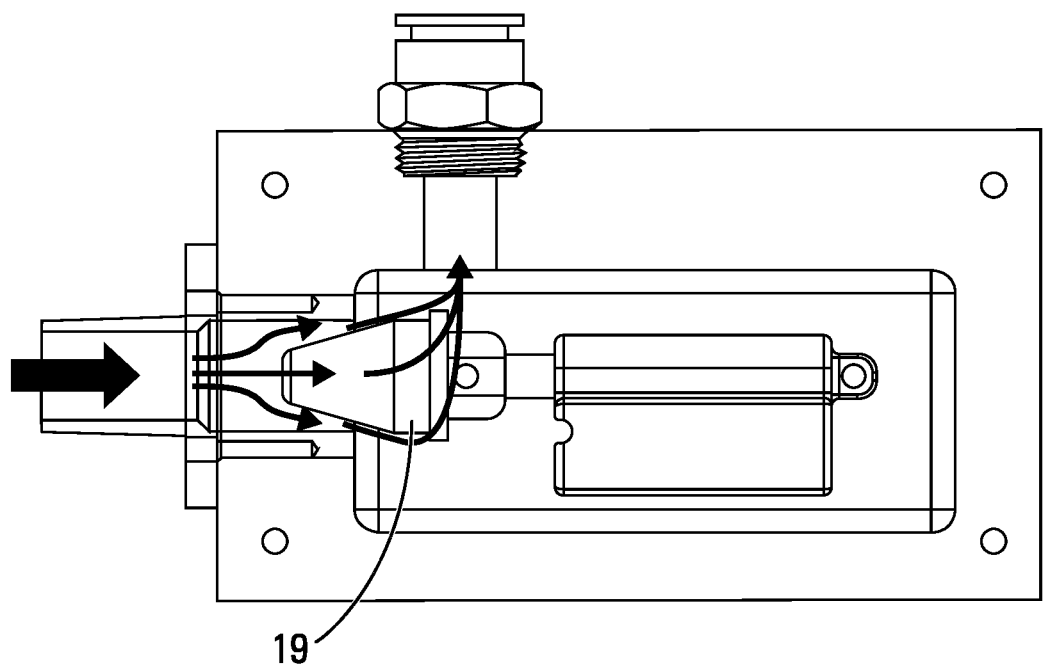
FIG. 3D is a cross sectional side view of an exemplary airway resistance device with an exemplary bullet-shaped plug fixed to a variable control mechanism consisting of a linear motor.

FIG. 3D is a side view of an exemplary airway resistance device with an exemplary bullet-shaped plug 19 fixed to a variable control mechanism consisting of a linear motor. Similar to the embodiment presented in FIG. 1A, this embodiment illustrates the use of a different plug type. Instead of having a plug 19 with a number of laminar flow channels on itself and varying a number and/or a length of such, the resistance is variably controlled by changing the width of a single laminar flow channel. In this embodiment, the laminar flow channel is the inlet and the bullet-shaped plug 19 is moved inside the inlet to reduce the width of the channel. The use of a bullet shape may help in maintaining a laminar flow, by reducing induced vortices, but any other type of shape limiting turbulence may be used without departing from the teachings of this disclosure.

Figure 3E:
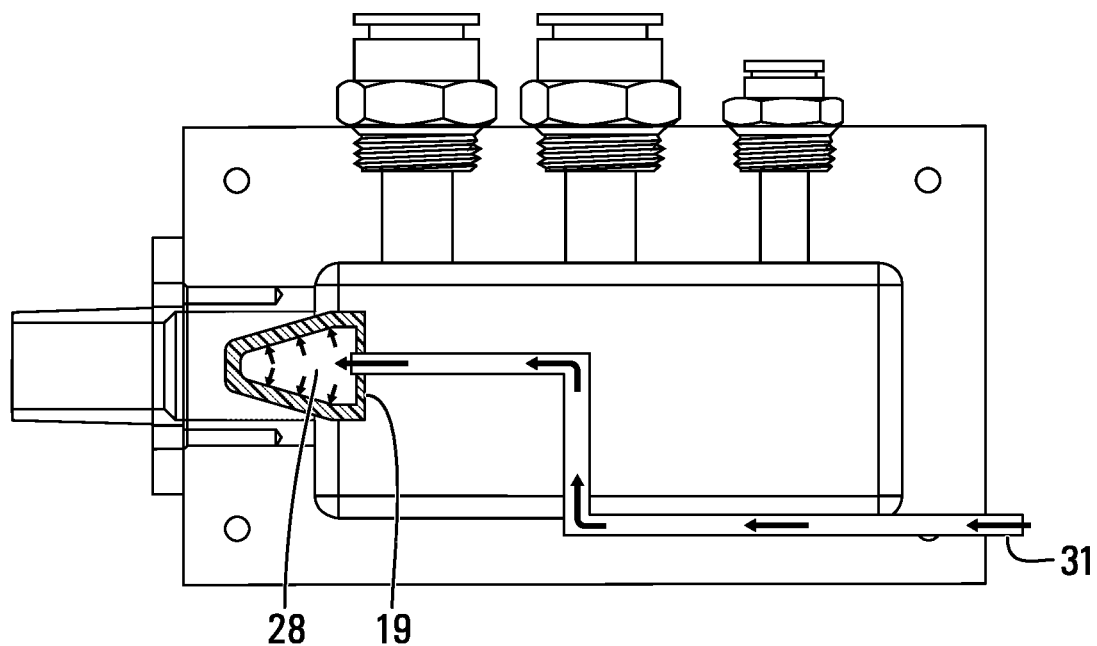
FIG. 3E is a cross sectional side view of an exemplary airway resistance device with an exemplary bullet-shaped deformable plug comprising an internal bladder to control its volume.

Now referring to FIG. 3E, which is a side view of an exemplary airway resistance device with an exemplary bullet-shaped deformable plug 19 comprising an internal bladder 28 to control its volume. In this embodiment, the control mechanism of FIGS. 1A and 3D (i.e. actuator displacing the plug) is replaced by a control mechanism which changes the shape of the plug 19. The plug 19 is therefore fixed at a position inside the inlet of the resistance device, made of deformable material (e.g., silicon, rubber, etc.) and includes an internal bladder 28. The internal bladder 28 is connected to an air source 31 to provide inflation and deflation capabilities. The inflation and deflation of the internal bladder 28 deform the plug 19 and thus variably occludes the inlet. This has the effect of changing the width of the laminar flow channel that is the inlet.

Figure 4:
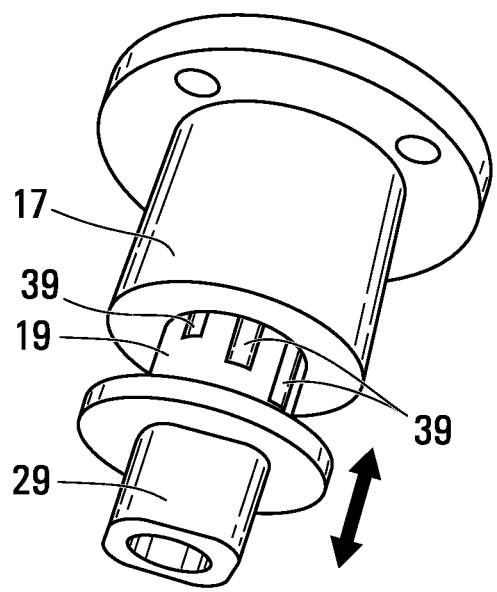
FIG. 4 is a picture of an exemplary cylindrical plug partially inserted in an exemplary cylindrical tube.

FIG. 4 is a picture of an exemplary cylindrical plug 19 partially inserted in an exemplary cylindrical inlet 17. In this picture, the attachment part 29 of the cylindrical plug 19 is designed to receive the rod of a linear motor. Laminar flow channels 39 are located on the outer surface of the cylindrical plug 19, similar to the embodiment of FIG. 3A, and the plug 19 slides inside the cylindrical inlet 17.

Figure 5:
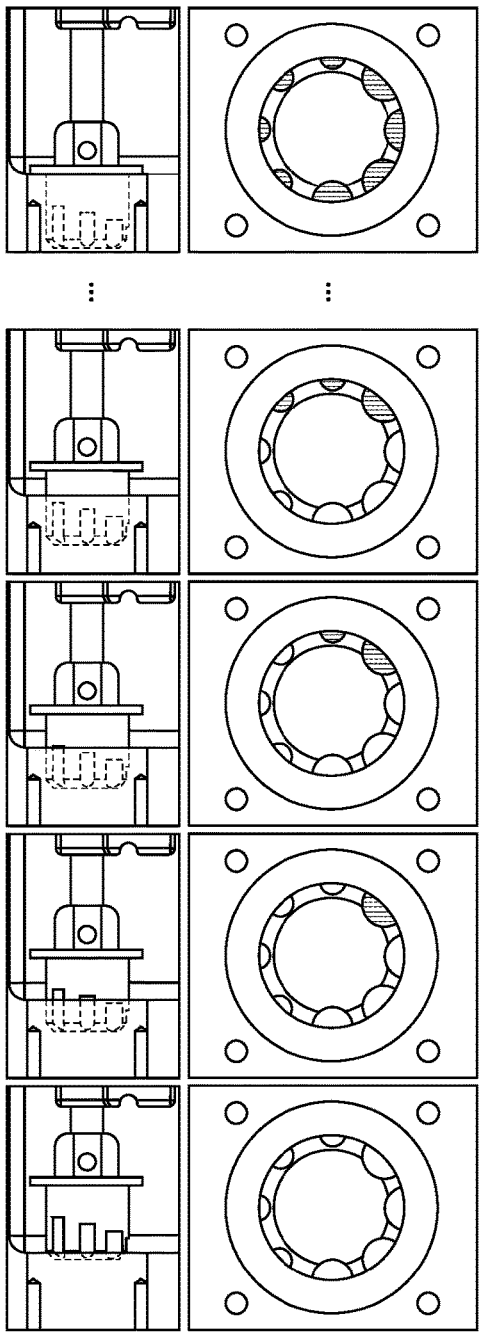
FIG. 5 is a combination of cross-sectional side views of different positions of an exemplary cylindrical plug inside a cylindrical inlet tube and their associated front views, illustrating the effect of varying the number of opened laminar flow channels.

Now referring to FIG. 5 which is a combination of side views of different positions of an exemplary cylindrical plug inside a cylindrical inlet tube and their associated front views, illustrating the effect of varying the number of opened laminar flow channels. As may be seen in this figure, the air may flow in open channels (represented by blank openings), the number of which (and their respective lengths) varies by the amount of insertion of the plug inside the inlet. The plug may be designed with any number of laminar flow channels that have any length, such as to provide a desired set of airway resistance that a user may need to adequately simulate all bronchial occlusion conditions.

Figure 6:
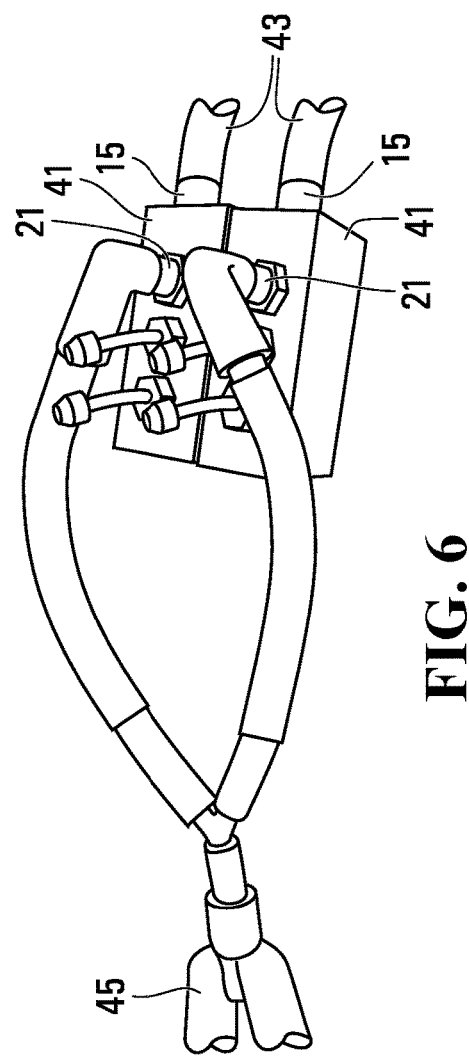
FIG. 6 is a picture of an exemplary setup of two exemplary airway resistance devices connected at their inlet and at one of their outlets.

FIG. 6 is a picture of an exemplary setup comprising two exemplary airway resistance devices 41 connected at their inlet adapter 15 and at one of their outlets 21. In this setup, the inlets of the devices 41 are connected to tubes 43 through an adapter 15 with the required gage for the tubes 43, such that no air may leak at the inlet. At their other ends, the tubes 43 can be connected to a mechanical ventilator or a bag mask, as would be used in a lung simulator device. The devices 41 used in this setup each can have three outlets 21, two of them being capped in order to limit the outflow of air to a single outlet 21 into a tubing system 45 that simulates the human respiratory system. The tubing system 45 may thereafter be connected to a lung simulator to perform any ventilation training with a component of bronchial resistance or occlusion.

Figure 7:
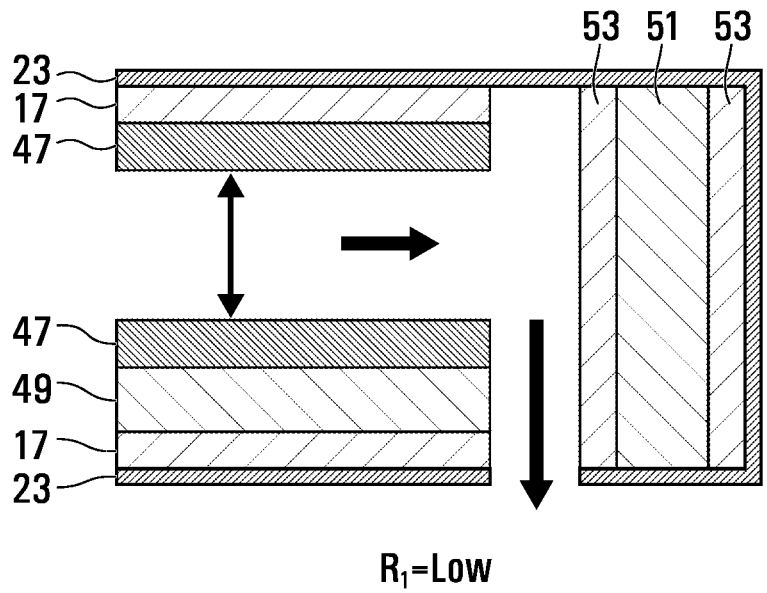
FIG. 7 is schematic of an exemplary airway resistance device, comprising a single laminar flow channel and two bladders as the control mechanism, in a low resistance configuration.

FIG. 7 is schematic of an exemplary bronchial resistance device, comprising a single laminar flow channel and two bladders 49, 51 as the control mechanism, in a low resistance configuration. In this embodiment, the air flow in a cylindrical inlet 17 which includes a single laminar flow channel enclosed in soft material 47 such as silicone or rubber. A bladder 49 is located inside the inlet 17 and outside of the soft material 47 to control of the flow restriction by moving the soft material 47 in such manner as to reduce or increase the width of the channel's cross-section. A second bladder 51 is included in the device in order to completely occlude the airflow when inflated. This second bladder 51 is enclosed between walls 53, such that the force of the airflow applied to the second bladder 51, which may be soft and flexible, is evenly distributed on all the bladder's surface.

It will be appreciated that an embodiment with a single bladder may be designed to control the resistance in the single laminar flow channel, and that the complete occlusion of the airway may be done by this single bladder design or by any other means. In some embodiments, the material 47 may be a rigid but movable sidewall of the channel, such that it may retain its general form when being displaced by the inflation and deflation of the bladder 49. In other embodiments, the material 47 may be the envelope of the bladder 49 itself.

Other embodiments of the single laminar flow channel includes a cylindrical bladder 49 that surrounds the soft material 47, such that a circular cross-section is maintained when inflating the bladder 49. In yet other embodiments, the bladder 49 is designed and located as to create a gentle slope towards the more restrictive end of the conduit, such that laminar flow conditions are maintained throughout the conduit.

Figure 8:
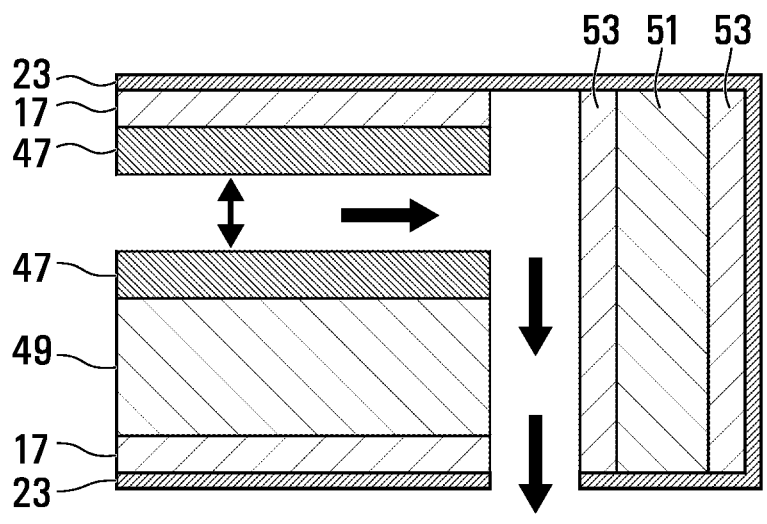
FIG. 8 is schematic of an exemplary airway resistance device, comprising a single laminar flow channel and two bladders as the control mechanism, in a high resistance configuration.

While FIG. 7 presents an exemplary single laminar flow channel airway resistance device in a low resistance configuration (i.e. low bladder 49 volume, such that the channel has a large cross-section), FIG. 8 presents the same embodiment but for a high resistance configuration.

Figure 9:
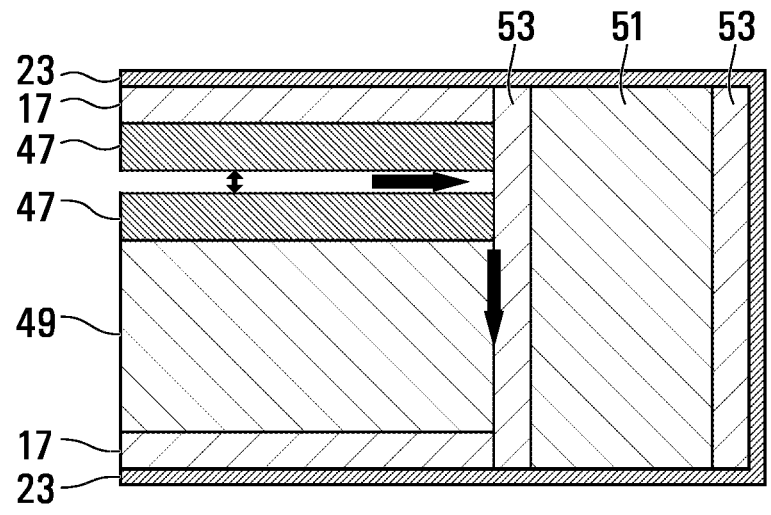
FIG. 9 is schematic of an exemplary airway resistance device, comprising a single laminar flow channel and two bladders as the control mechanism, in a completely occluded configuration.

Similarly, FIG. 9 presents the same embodiment as the one detailed at FIG. 7 but in a completely occluded configuration; the occlusion being done by an inflated second bladder 51.

Figure 10:
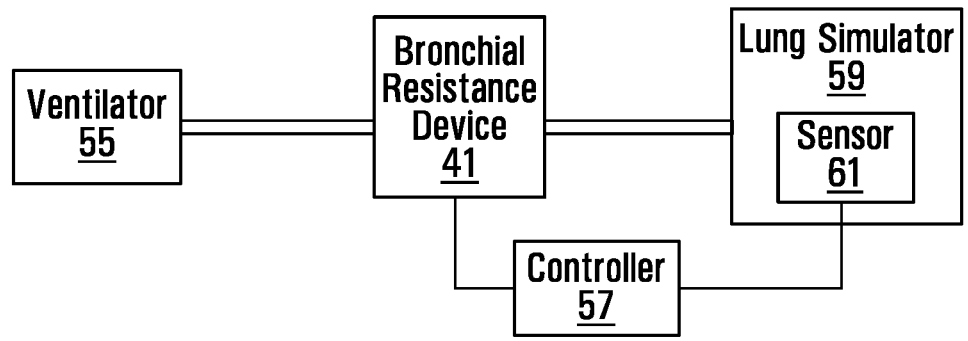
FIG. 10 is a schematic of an exemplary dynamically controlled airway resistance device connected to a ventilator at its inlet and to a lung simulator at its outlet, the resistance being controlled by a controller operably connected to a sensor of the lung simulator.

Now referring to FIG. 10 which is a schematic of an exemplary setup using an airway resistance device 41. The resistance device 41 is connected to a ventilator 55 at its inlet, via a tube, and to a lung simulator 59 at its outlet. In this embodiment, the resistance setting of the airway resistance device is controlled by a controller 57 operably connected to a sensor 61 of the lung simulator 59.

The sensor 61 may be any type of sensor that provides the system with an indication of the respiratory phase of the lung simulator. It may be a position sensor, a volume sensor or a pressure sensor depending on the type of lung simulator used in the setup. The controller 57 may be any electronic means (e.g., computer) that provides an input interface to receive data signal from a sensor 61, that may interpret the received input and apply a logic to it (e.g., software) and provides an output to transmit a control signal to the bronchial resistance device 41.

This embodiment allows the airway resistance simulator 41 to be used dynamically. In other words, the controller 57 may change the resistance setting based on different readings of the sensor 61. For example, the sensor 61 may allow the system to determine in which respiratory phase (i.e. inhalation or exhalation) the lung simulator is in and change the airway resistance accordingly.

In an embodiment of a statically controlled airway resistance device 41, the setup may not require the sensor 61. Additionally, the controller 57 may be activated and controlled manually. In yet other embodiments, the setup may not comprise a controller 57 and the resistance setting of the airway resistance device may be done manually and mechanically on the device itself.

The system of FIG. 10 can be used also without a sensor 61 and controller 57 can be a manual controller. The resistance device 41 provides airway resistance device that is linear, namely the pressure drop is proportional to respiration airflow. This allows the user to select a fixed resistance for the lung for a simulation that does not change as airflow is changed. This means that the airway resistance setting can be fixed for a number of respiratory cycles of respiration airflow. In some cases, the control mechanism can be used to change the airway resistance during a simulation, for example to increase the desired airway resistance during the simulation to simulate an increase in airway resistance, as for example to simulate an asthma attack.

Figure 11:
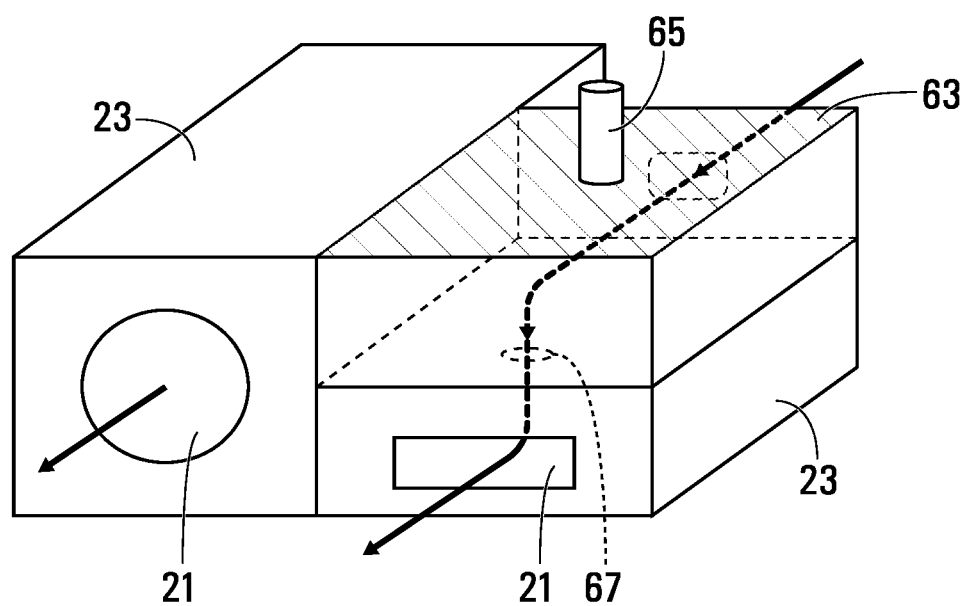
FIG. 11 is a schematic of an exemplary dual resistance airway resistance device comprising two separate flow paths.

Now referring to FIG. 11, which is a schematic of an exemplary dual resistance airway resistance device comprising two separate flow paths. It may be desirable to have an airway resistance device which allows a different resistance for inhalation and exhalation without being dynamically controlled. In the embodiment of FIG. 11, the airway resistance device is separated in two sections, therefore providing two separate airflow paths to the outlets 21. Each of the sections may be an airway resistance device enclosed in its own frame 23 and with any of the components presented in the other embodiments herein. This dual resistance device may have a single inlet providing the airflow to each section.

One section may have a check valve 67, such that the air may only flow in one direction. As such, the dual resistance device may have both airflow paths opened to airflow for a patient's inhalation while only having one open airflow paths for exhalation. Thus, this allows for statically providing different resistances for the phases of respiration. The dual resistance device may also have a membrane 63 of deformable material (e.g., silicone, rubber, etc.) which may be deformed in order to completely obstruct the airflow paths, as required in order to simulate bronchial occlusion.

Deformation of the flexible membrane 63 may be done by any means, such as with a compressed air outlet 65 above said membrane 63. Pushing compressed air exercises enough force on the flexible membrane to deform it such that it blocks the airflow inside the dual resistance device. It will be understood by a person skilled in the art that any means of obstructing the airflow paths may equivalently be used (e.g., actuator with a piston, etc.).

What is claimed is:

1. A lung simulation system comprising:
a lung simulator; and
an airway resistance device connectable to said lung simulator and configured to restrict an airflow being provided to said lung simulator, said airway resistance device comprising:
   a body defining an airtight internal chamber having an inlet and an outlet, said airtight internal chamber allowing said airflow to flow from said inlet to said outlet; and
   a variable occlusion mechanism cooperating with said airtight internal chamber to define one or more laminar flow channels and comprising a control mechanism to selectively vary at least one of a width, a length and a number of said one or more laminar flow channels to vary a simulated airway resistance between said inlet and said outlet,
wherein said variable occlusion mechanism includes at least one member selected from the group consisting of:
   (a) a plug mounted in said airtight internal chamber, wherein the one or more laminar flow channels are defined on an outer surface of said plug;
   (b) a plug mounted in said airtight internal chamber, wherein the one or more laminar flow channels are located on an inner surface of at least one of said inlet and said outlet of said airtight internal chamber;
   (c) a bullet-shaped plug, wherein the one or more laminar flow channels comprising a single laminar flow channel defined by the inlet and the bullet-shaped plug, the bullet-shaped plug being moveable within the inlet to adjust the width of the single laminar flow channel; and
   (d) a displaceable sidewall, wherein said control mechanism includes at least one bladder connectable to an actuator for displacing said displaceable sidewall to increase or decrease said width of said one or more laminar flow channels.

2. The lung simulation system of claim 1, wherein said variable occlusion mechanism comprises said member (a).

3. The lung simulation system of claim 2, wherein said control mechanism comprises a linear actuator connected to said plug.

4. The lung simulation system of claim 3, wherein said linear actuator comprises a bladder connectable to a fluid source and an inflation or deflation of said bladder results in said plug moving to a position within a conduit between said inlet and said airtight internal chamber.

5. The lung simulation system of claim 1, wherein said variable occlusion mechanism comprises said member (b).

6. The lung simulation system of claim 5, wherein said control mechanism comprises a linear actuator connected to said plug.

7. The lung simulation system of claim 6, wherein said linear actuator comprises a bladder connectable to a fluid source and an inflation or deflation of said bladder results in said plug moving to a position within a conduit between said inlet and said airtight internal chamber.

8. The lung simulation system of claim 2, wherein said one or more laminar flow channels comprise at least two laminar flow channels of different lengths so that displacement of said plug varies the number of opened one of said at least two laminar flow channels.

9. The lung simulation system of claim 8, wherein said one or more laminar flow channels comprise at least four laminar flow channels of different lengths so that displacement of said plug varies the number of opened one of said at least four laminar flow channels.

10. The lung simulation system of claim 1, wherein said variable occlusion mechanism comprises said member (c).

11. The lung simulation system of claim 10, wherein said bullet-shaped plug is inflatable and connectable to a fluid source, said bullet-shaped plug being configured to expand and contract with fluid pressure to vary said width of said single laminar flow channel.

12. The lung simulation system of claim 1, wherein said variable occlusion mechanism comprises said member (d).

13. The lung simulation system of claim 12, wherein said control mechanism comprises at least one bladder connectable to a fluid source and an inflation or deflation of said at least one bladder displaces said displaceable sidewall to increase or decrease said width of said one or more laminar flow channels.

14. The lung simulation system of claim 1, further comprising:
a sensor system configured to measure a state of lung inflation and deflation of said lung simulator; and
a controller operably connected to said sensor system and said control mechanism, said controller providing dynamic control to said airway resistance device to vary said simulated airway resistance depending on said measured state.

15. A method of simulating lungs comprising:
connecting an airway resistance device to a lung simulator, said airway resistance device comprising:
   a body defining an airtight internal chamber having an inlet and an outlet, said airtight internal chamber allowing said airflow to flow from said inlet to said outlet; and
   a variable occlusion mechanism cooperating with said airtight internal chamber to define one or more laminar flow channels and comprising a control mechanism to selectively vary at least one of a width, a length and a number of said one or more laminar flow channels to vary a simulated airway resistance between said inlet and said outlet,
wherein said variable occlusion mechanism includes at least one member selected from the group consisting of:
   (a) a plug mounted in said airtight internal chamber, wherein the one or more laminar flow channels are defined on an outer surface of said plug;
   (b) a plug mounted in said airtight internal chamber, wherein the one or more laminar flow channels are located on an inner surface of at least one of said inlet and said outlet of said airtight internal chamber;
   (c) a bullet-shaped plug, wherein the one or more laminar flow channels comprising a single laminar flow channel defined by the inlet and the bullet-shaped plug, the bullet-shaped plug being moveable within the inlet to adjust the width of the single laminar flow channel; and
   (d) a displaceable sidewall, wherein said control mechanism includes at least one bladder connectable to an actuator for displacing said displaceable sidewall to increase or decrease said width of said one or more laminar flow channels;

adjusting said control mechanism in accordance with a desired airway resistance for a simulation; and applying a source of respiration airflow to said lung simulator through said airway resistance device.

16. The method of claim 15, wherein said applying a source of respiration airflow to said lung simulator through said airway resistance device causes a pressure drop across said airway resistance device that is proportional to said respiration airflow.

17. The method of claim 15, wherein said adjusting said control mechanism in accordance with a desired airway resistance for a simulation comprises keeping said control mechanism fixed with said desired airway resistance while said applying provides a number of respiratory cycles of respiration airflow.

18. The method of claim 17, wherein said adjusting said control mechanism in accordance with a desired airway resistance for a simulation comprises increasing said desired airway resistance during said simulation to simulate an increase in airway resistance.

* * * * *